(12) United States Patent
Krishnan

(10) Patent No.: US 7,836,341 B1
(45) Date of Patent: *Nov. 16, 2010

(54) SYSTEM AND METHOD FOR AUTOMATICALLY DIAGNOSING PROTOCOL ERRORS FROM PACKET TRACES

(75) Inventor: Prabhakar Krishnan, Sunnyvale, CA (US)

(73) Assignee: NetApp, Inc., Sunnyvale, CA (US)

( * ) Notice: Subject to any disclaimer, the term of this patent is extended or adjusted under 35 U.S.C. 154(b) by 68 days.

This patent is subject to a terminal disclaimer.

(21) Appl. No.: 11/752,379

(22) Filed: May 23, 2007

Related U.S. Application Data

(63) Continuation of application No. 10/395,405, filed on Mar. 24, 2003, now Pat. No. 7,249,286.

(51) Int. Cl.
*G06F 11/00* (2006.01)
(52) U.S. Cl. .......................... 714/26; 714/43
(58) Field of Classification Search ............ 714/43, 714/26
See application file for complete search history.

(56) References Cited

U.S. PATENT DOCUMENTS

| | | | |
|---|---|---|---|
| 5,696,486 A * | 12/1997 | Poliquin et al. ............ 340/506 |
| 5,819,292 A | 10/1998 | Hitz et al. |
| 5,951,661 A * | 9/1999 | Tavallaei et al. ........... 710/105 |
| 5,963,962 A | 10/1999 | Hitz et al. |
| 6,038,570 A | 3/2000 | Hitz et al. |
| 6,219,050 B1 * | 4/2001 | Schaffer .................... 715/853 |
| 6,347,375 B1 * | 2/2002 | Reinert et al. ............... 726/24 |
| 6,671,828 B1 * | 12/2003 | Tursich ....................... 714/39 |
| 6,782,345 B1 * | 8/2004 | Siegel et al. ............... 702/183 |
| 6,819,655 B1 * | 11/2004 | Gregson ..................... 370/242 |
| 6,834,360 B2 * | 12/2004 | Corti et al. .................... 714/37 |
| 6,922,417 B2 | 7/2005 | Vanlint |
| 6,990,591 B1 * | 1/2006 | Pearson ....................... 726/22 |
| 2001/0050903 A1 * | 12/2001 | Vanlint ...................... 370/252 |
| 2002/0049930 A1 * | 4/2002 | Hannigan .................... 714/39 |
| 2002/0194319 A1 * | 12/2002 | Ritche ........................ 709/223 |
| 2004/0187048 A1 * | 9/2004 | Angamuthu et al. ......... 714/27 |
| 2006/0010349 A1 * | 1/2006 | Dun et al. .................... 714/39 |
| 2006/0085689 A1 * | 4/2006 | Bjorsne ....................... 714/39 |

OTHER PUBLICATIONS

David Hitz et al. TR3002 File System Design for a NFS File Server Appliance published by Network Appliance, Inc.
Common Internet File System (CIFS) Version: CIFS-Spec 0.9, Storage Networking Industry Association (SNIA), Draft SNIA CIFS Documentation Work Group Work-in-Progress, Revision Date: Mar. 26, 2001.
Fielding et al. (1999) Request for Comments (RFC) 2616, HTTP/1.1.
Hongbo Liu, SSFNET TCP Simulation Analysis by tcpanaly, Apr. 16, 2000.

(Continued)

*Primary Examiner*—Bryce P Bonzo
(74) *Attorney, Agent, or Firm*—Cesari and McKenna, LLP

(57) ABSTRACT

A system and method for automatically diagnosing protocol errors from packet traces is provided. The system and method performs an automatic trace analysis on a packet trace to generate an analysis that is then fed into a diagnosis/resolution module. The diagnosis/resolution compares the trace analysis with the database of known problems to identify the protocol error and a suggested solution. The suggested solution then may be implemented, either by a user or by the DR module, to correct the protocol error.

18 Claims, 9 Drawing Sheets

OTHER PUBLICATIONS

Vern Paxson, Network Research Group, Automated Packet Trace Analysis of TCP Implementations.

M.Mellia et al. Measuring IP and TCP behavior on a Edge Node, Submitted to IEEE INFOCOM 2002.

* cited by examiner

SYSTEM AND METHOD FOR AUTOMATICALLY DIAGNOSING PROTOCOL ERRORS FROM PACKET TRACES

RELATED APPLICATIONS

This application is a continuation of U.S. Ser. No. 10/395,405, filed on Mar. 24, 2003 now U.S. Pat. No. 7,249,286 by Prabhakar Krishnan.

FIELD OF INVENTION

The present invention relates to computer networks and, more particularly, to diagnostics for such networks.

BACKGROUND OF THE INVENTION

The Transport Control Protocol (TCP) is one of the most widely used data transport protocols in network environments. TCP is used in the Internet and in many Intranet and network backbones where both application servers and Network Attached Storage (NAS) servers are interconnected by a high-speed network. The Transport Control Protocol is also used as the reliable transport mechanism for many network is attached storage protocols, including the Common Internet File System (CIFS), the Network File System (NFS) and also for Storage Area Network protocols such as Small Computer Systems Interface commands encapsulated within the Transport Control Protocol/Internet Protocol (iSCSI). TCP is a robust protocol and provides reliable connection-oriented communication over a wide variety of network topologies and at a variety of speeds. However, the observed data transfer rate may be less than anticipated, or the actual availability of data servers may be less than estimated because of numerous factors. The availability of data servers may be affected by, for example, problems with the network interconnecting the data servers and clients. Such problems could include, e.g., a failure of routers/switches and loss of connectivity due to incorrect cabling and/or failures in a cable. There are several possible problems that may arise in the implementation of the protocol. Packet transmitters or receivers (or both) may be poorly configured or overloaded. The network or the portion thereof may lack sufficient bandwidth. Multiple data packet losses may occur and require coarse grained retranmissioned timeouts. The file system protocol stack layered over TCP/IP may have implementation errors. The Transport Control Protocol (TCP) stack at the endpoints may exhibit bad behavior. Optimizations used within the network path may have generated errors. And, interoperability errors may result between heterogeneous operating system endpoints.

These errors and problems may be caused by faulty protocol implementations in software or hardware executing on a network. These errors may also be generated by, for example improper configuration of hardware and/or software settings and parameters, faulty network wiring or by improperly planned network installations.

As most TCP/IP and file system protocol implementations are not designed for easy debugging of problems, various techniques have been designed to diagnose is protocol-related problems. One common technique involves using some form of packet capture mechanism, such as the Berkeley Packet Filters to capture packets. Manual analysis by experts of the captured low-level packet traces is then used to isolate abnormal protocol behavior and to trace the behavior to misconfigured, overloaded or faulty elements in a network. Although this technique permits the analysis of specific transmissions, it is generally inconvenient, costly and error-prone.

In a modern networking environment, the typical local area network (LAN) centered around company's operations may utilize hardware and/or software from a variety of different vendors. The customer (or client) of these vendors may be faced with a variety of differing protocol implementations and error reporting mechanisms. As customers typically do not have a staff of well-trained network engineers to aid in the debugging or isolating protocol errors, customers rely on the customer service and technical staffs of vendors from which the purchase or acquire their software and/or hardware. With the increasing design of the heterogeneous network environments, the number of protocol errors requires an ever increasing amount of customer service time and man power. This results in an increased cost to vendors, which may be passed onto customers in the form of increased prices.

By way of example, network environment 100 is shown in FIG. 1. The network environment 100 is centered around a wide area network, such as the well-known Internet 105. Connected to the Internet is a customer service site 110. The customer service site 110 is associated with a provider of hardware and/or software executing around the LAN and provides, inter alia, a data connection for customer uploading of packet traces for technical support analysis. Also connected to the Internet 105 is a Local Area Network (LAN) 115 that is associated with a particular customer's network. Attached to the LAN 115 may be an application server 120, a client 125 and a file server 130, which is also connected to a set of disks 135. It should be noted that the network configuration shown here is exemplary only. For example, the Local Area Network (LAN) may be a Wide Area Network (WAN) or a Virtual Private Network (VPN) or any other networking environment. Additionally, any number of devices, including, for example, additional servers, clients, and file servers, may be connected to the LAN.

In known diagnostic systems, a customer needs to create a packet trace and upload it to the customer service site for manual analysis by a customer engineer. A flowchart detailing the steps of such a manual analysis procedure 200 is shown in FIG. 2. Initially, in step 205, the customer creates a trace file. The trace file can be captured at the problem scene using well-known and conventional trace-capture programs including the freeware applications, such as EtheReal, snoop, tcpdump or NetMon. Next, in step 210, the customer sends the trace file to the customer service site. Typically, the customer uses the File Transfer Protocol (FTP) or similar protocol to send the trace file to the customer service site 110 over the Internet. A noted disadvantage of the use of FTP to send these trace files is the size of the trace files. In some environments, the trace file may exceed 1 gigabyte (GB) in size. Thus, a related disadvantage of sending the trace file is the concomitant network bandwidth required to transfer such a large quantity of data.

At some time after receipt of the trace file, in step 215, customer service manually analyzes the file to diagnose a problem. Customarily, each customer service engineer analyzing a given trace file uses a collection of learned know how and personal experience to identify particular problems. Individual engineers may be able to quickly recognize particular errors from the given trace file due to their recurring appearance. Hence, the effectiveness of this manual analysis relies on the individual capabilities and skill of the customer service engineer performing the analysis. Depending upon the complexity of the trace file, it may take a customer service expert up to 24 hours to manually analyze the trace file. Once the trace file has been analyzed and a diagnosis generated, the customer service center then alerts the customer of the identified problem (step 220). The customer may then take the appropriate prescribed remedial action to correct the identified problem.

As the number and complexity of network traces that are delivered to customer service stations increases, customer service stations experience longer resolution cycles. However, customers demand of quick resolution of networking errors, because of the potential for lost productivity and income. Thus, a technique for automating trace analysis and diagnosis to identify protocol errors and to suggest possible solutions is highly desirous.

SUMMARY OF THE INVENTION

The disadvantages of the prior art are overcome by providing an automatic trace analysis system and method for diagnosing protocol errors from packet traces attributed to a given user ("a customer"). This automatic trace analysis system and method may be implemented as software either on a customer service station's computers or, in alternate embodiments, or on a customer's own computers.

In one embodiment, a trace file is generated of packet data passing through a LAN associated with a customer's site. This trace file is then transferred to a customer service site, where it is fed into an automatic trace analysis (ATA) module. The ATA module performs a packet trace analysis of the trace file to identify potential errors or inconstancies, variances or aberrations with a given protocol standard. The results of the trace files are then transferred to a diagnosis/resolution generation module. The DR module compares the resulting trace analysis file with a trace signature database to identify and diagnose the problem.

In an alternate embodiment, a trace file is generated of packet data passing through a LAN associated with a customer's site. This generated trace file is then sent to a locally run ATA module, which performs a packet trace analysis of the trace file to identify potential errors or inconsistencies with a given protocol standard. The results of the trace file is then transferred to a diagnosis/resolution (DR) generation module that compares the resulting trace analysis data with the signature database to identify and diagnose an protocol error. In this embodiment, the transferring of a trace file from the customer site to the customer service site is unnecessary. An update procedure is available from the customer service site wherein newly identified errors and protocol traces are transferred from the customer service site to client site to update a client or is customer's local signature trace database.

In the illustrative embodiment, the DR module identifies the suggested solution for a given protocol error. The administrator or user of a customer site must implement the suggested solution. However, in alternate embodiments, the DR module is programmed to automatically perform the suggested solution, thereby creating an automatic analysis, diagnosis and correction mechanism.

BRIEF DESCRIPTION OF THE DRAWINGS

The above and further advantages of the invention may be better understood by referring to the following description in conjunction with the accompanying drawings in which like reference numerals indicate identically or functionally similar elements, of which.

DETAILED DESCRIPTION OF ILLUSTRATIVE EMBODIMENTS

A. Automatic Diagnosis Environment

As noted above, in a typical network installation, a variety of vendors provide the software and/or hardware for a given customer's network. The teachings of the present invention are directed to a system and method for automatically diagnosing protocol errors using a trace file. The system and method may be implemented by one or more vendors associated with a customer. For example, a vendor of a network attached storage file server may utilize the teachings of the present invention to diagnose protocol errors relating to its implementation of TCP/IP or other protocols. Similarly, a vendor of an application or database server may also utilize the teachings of the present invention.

In accordance with various embodiments of the present invention, there exists a spectrum of possible configurations of the automatic trace analysis (ATA) module, diagnosis/resolution generation module (DR), both of which are described further below. At one end of the spectrum of possible configurations, the DR and ATA modules operate from the customer service site with only a trace file being generated locally at the customer site. At the other end of the spectrum, the ATA and DR modules run locally on the customer site and operations for solution implementations are automatically selected and executed. As will be apparent to those skilled in the art, the various embodiments of the present invention may be utilized to accommodate a specific customer's computing and network needs, availability and desires. Thus, the following description of illustrative embodiments shall be taken as exemplary only.

Figure 1:
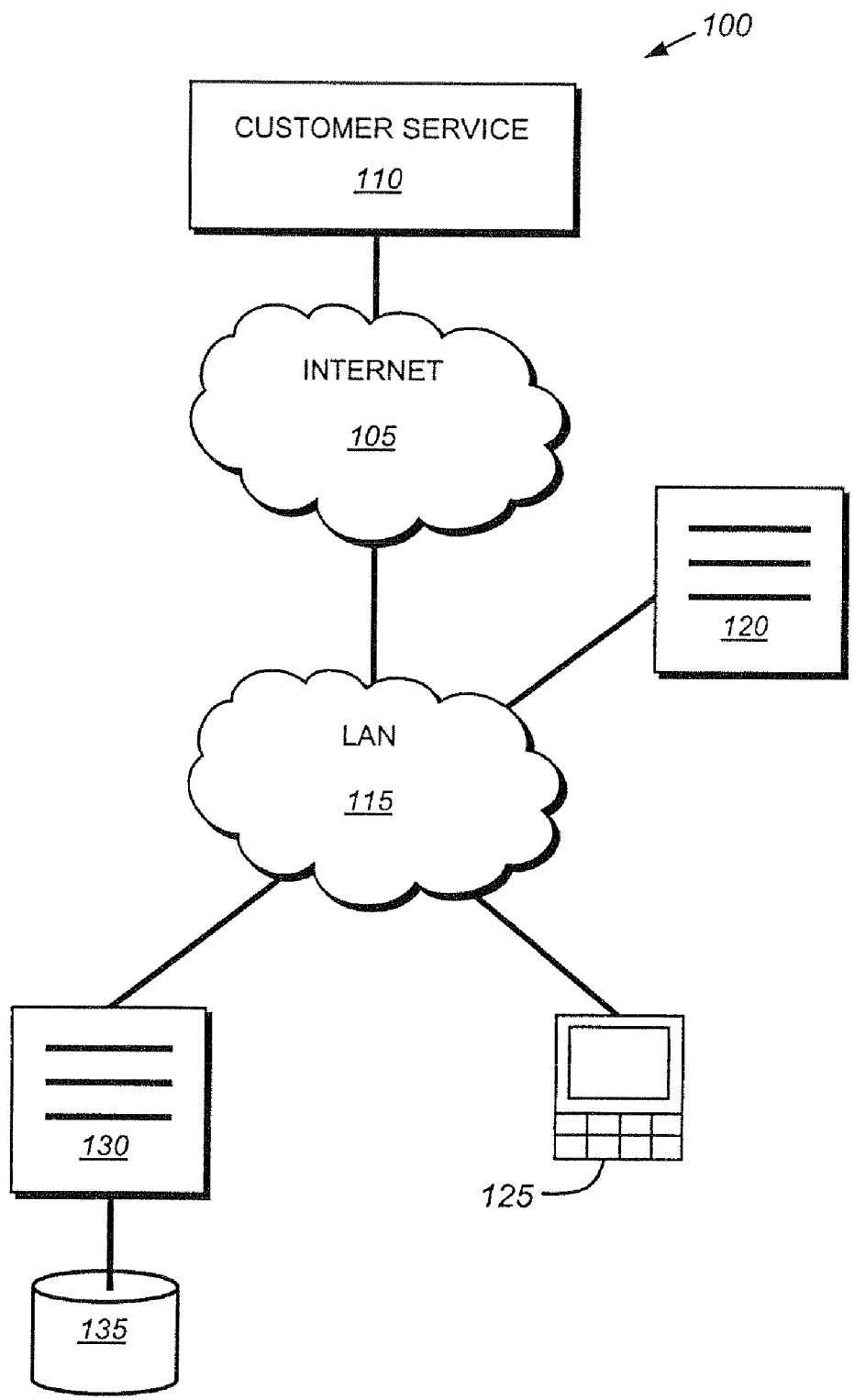
FIG. 1, already described, is a schematic block diagram of an exemplary network environment in accordance with an embodiment of the invention.
Figure 2:
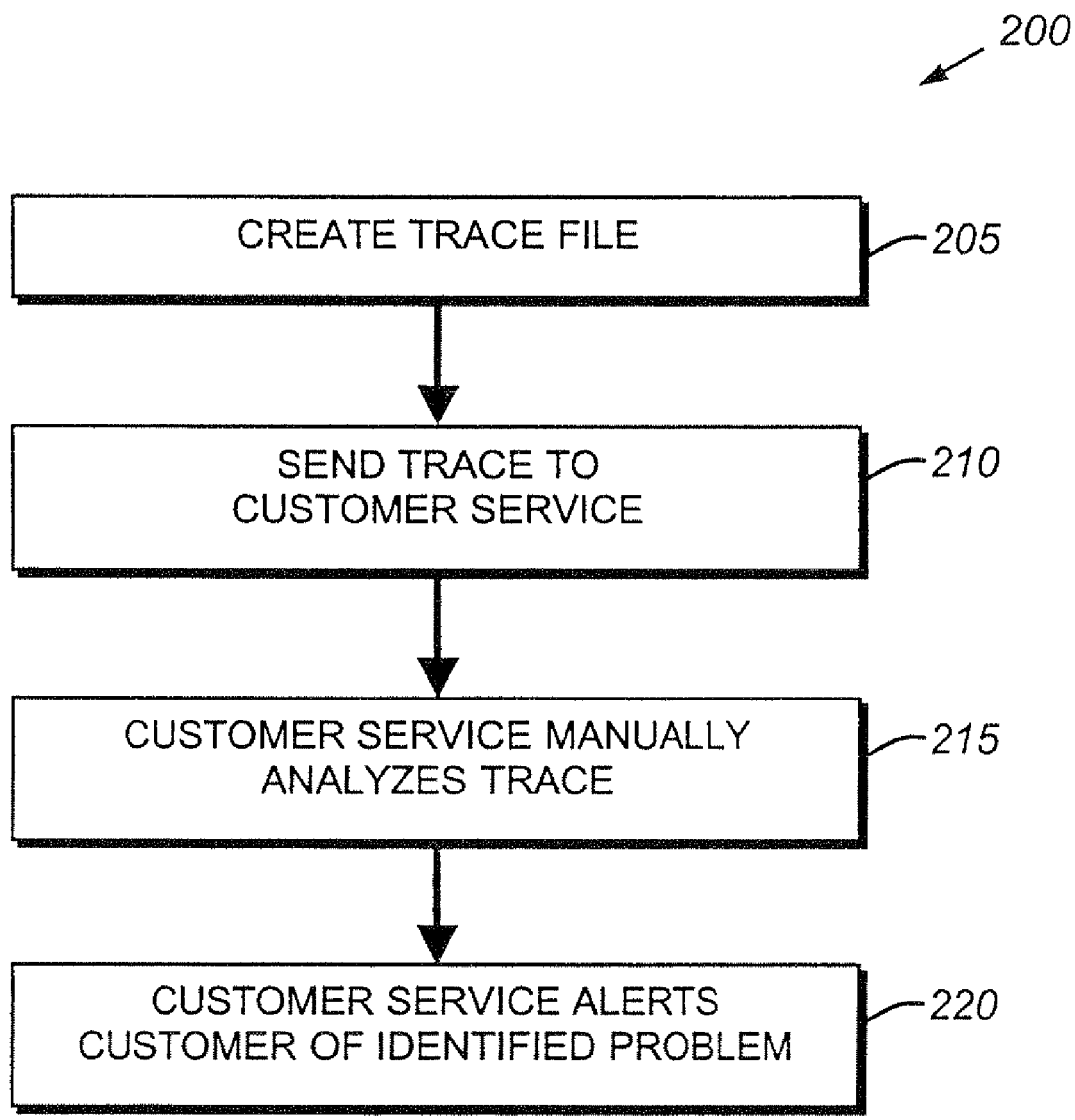
FIG. 2, already described, is a flow chart detailing the steps of a procedure of a prior art procedure for manually analyzing a trace.
Figure 3:
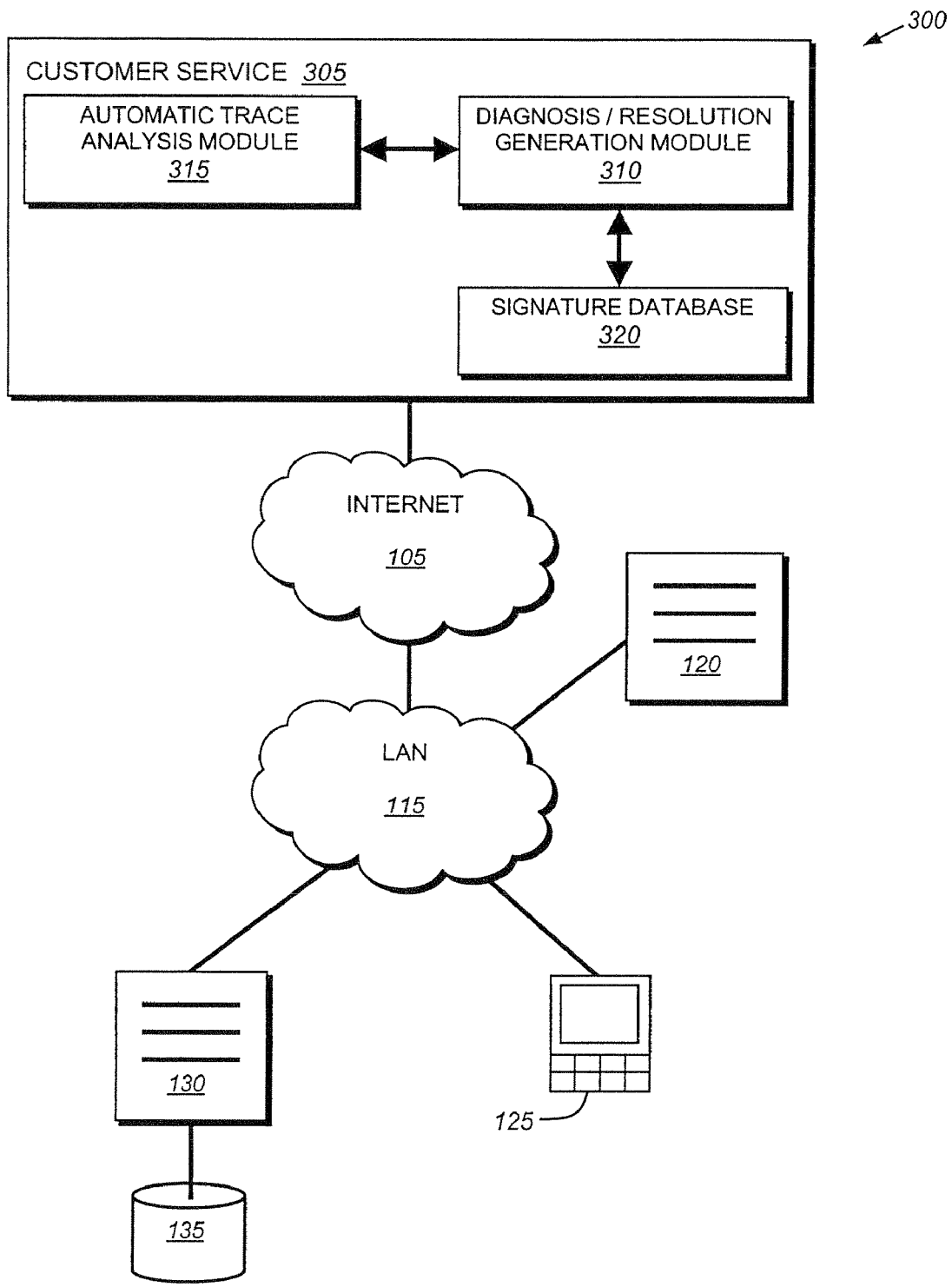
FIG. 3 is a schematic block diagram of an exemplary network environment detailing a customer service site with automatic trace analysis in accordance with an embodiment of the invention.

An exemplary network environment 300 that implements an illustrative embodiment of the automatic trace analysis and diagnosis of the present invention is shown in FIG. 3. The environment 300 centers around the Internet 105 and a local area network (LAN) 115 as did the environment 100 of FIG. 1. Similar to environment 100, the exemplary environment 300 includes a server 120, a client 125 and a file server 130 interconnected with the LAN 115. It should be noted that the LAN may be any form of an acceptable networking environment including, for example, a wide area network (WAN) or a virtual private network (VPN).

In accordance with the present invention, the customer service site 305 includes a diagnosis and resolution generation module (DR) 310. The diagnosis and resolution generation module 310 compares a generated trace analysis from an automatic trace analysis module (ATA) 315, described further below, with the entries of a problem signature database 320 to arrive at a diagnosis of the protocol error. The problem signature database 320 includes entries that correlates trace signatures with a diagnosis and one or more suggested actions or resolutions to be performed. These vendor or product-specific databases are generated by the customer service or technical support staff of the vendor in conjunction with the engineering team to arrive at a set of proven and reliable diagnoses. The generation of the signature database results from a variety of techniques, including application of personal knowledge, observing problems and carrying out effective solutions, and application of other inductive and deductive approaches. The DR module 310 can then select a resolution or suggested solutions from the set provided. These solutions, described further below, may then be implemented by a customer to correct the error condition. The ATA module 315 generates a traces analysis of a trace file that can be utilized with the above-described DR 310. The ATA module 315 may be implemented using a variety of open source or freeware programs including, for example, NetMon, EtheReal, tcpanaly or tcptrace. Such programs may be executed from a command line interface (CLI) or, in alternate embodiments, via a graphical user interface (GUI). In a CLI embodiment, a user may specify a variety of options, including, for example, what network interface to monitor, how many packets to capture, a file name to store data in and whether TCP/IP names should be resolved using DNS. These programs typically have a multi-column output that shows a variety of data, including, for example, a timestamp, a source address, a destination address, the type of protocol and the contents of the data section of the packet. The tcpanaly program is described in further detail in SSFNET TCP Simulation Analysis by tcpanaly, by Hongbo Liu, dated Apr. 16, 2000 and in Automated Packet Trace Analysis of TCP Implementations by Vern Paxson, the contents of which are hereby incorporated by reference. Alternately, the ATA may be based upon proprietary code written by the product or vendor of a given hardware/software product.

Figure 4:
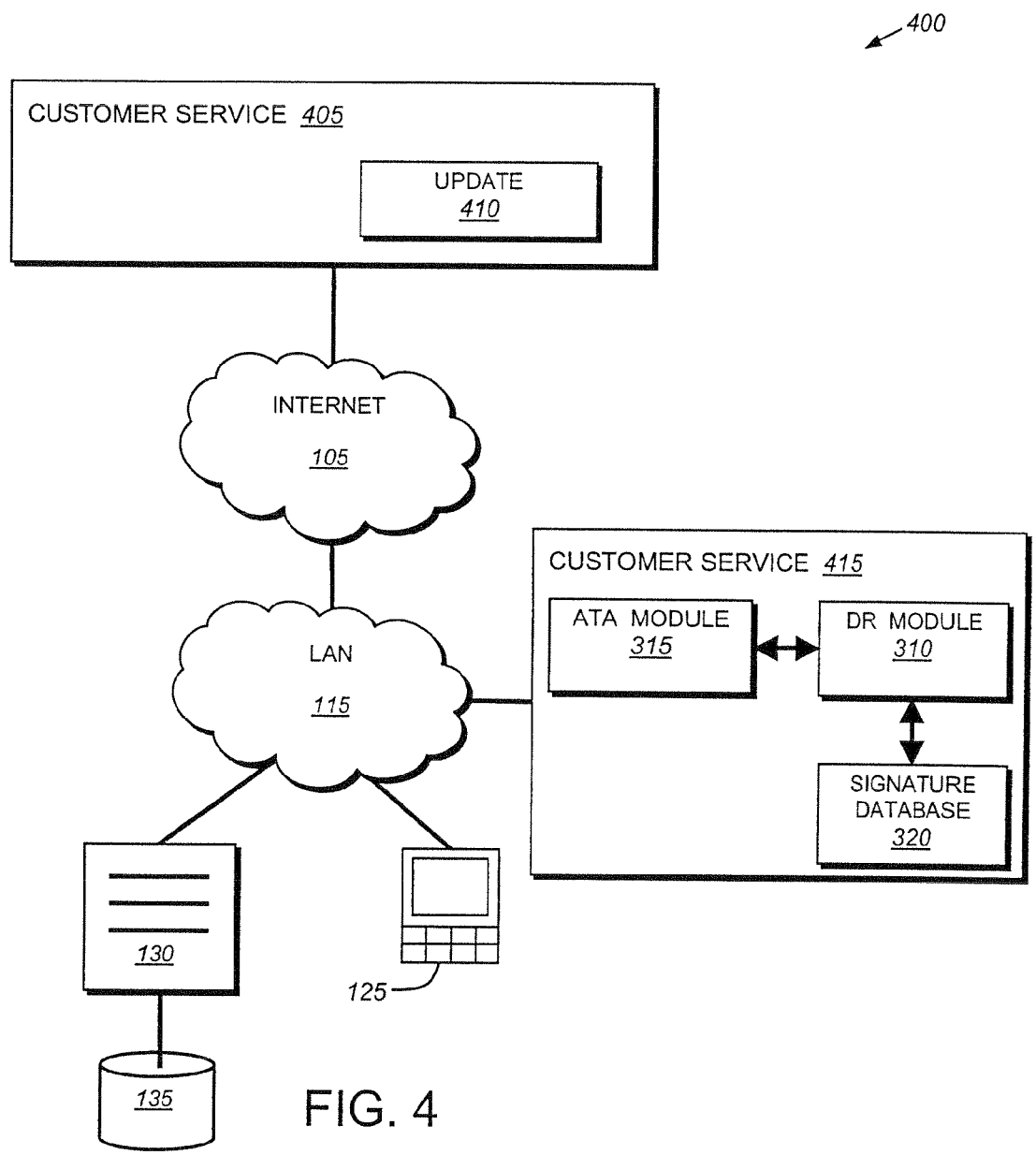
FIG. 4 is a schematic block diagram of an exemplary network environment detailing a customer service site with automatic trace analysis in accordance with an embodiment of the present invention.

An alternative embodiment of the network environment 400 is shown in FIG. 4. In this exemplary alternate embodiment, the diagnosis DR module 310 and its corresponding ATA module 315 are contained within a client 415 connected to the customer's LAN 115. The customer service site 405 includes an update module 410 that transmits revised information to the DR and ATA modules 310 and 315 to update the signature database 320. This update procedure, enables the DR and ATA modules 310 and 315 to utilize the most up-to-date trace and diagnosis information available for diagnosis solution generation. In one exemplary embodiment, the update procedure sends updated database information to customer sites when new information is available. In alternate embodiments, customer sites may need to contact the update procedure via, for example, the World Wide Web (WWW) to initiate a download of updated information.

The update database information is generated by the customer service engineers from the vendor by examining new protocol traces and identifying signatures therein. Additionally, the signature database may need to be updated when, for example a new patch is available to correct a known or existing protocol error.

It should be noted, that the above-described environments are exemplary only in that the teachings of the present may be practiced in a variety of network environments. For example the ATA and DR modules may reside on different systems. Furthermore, for example, the ATA module may reside locally on the customer's site, but the DR module may be located on the customer service site. In such an embodiment, the trace is file would not need to be transferred but instead the trace analysis from the ATA analysis would need to be transferred from the customer site to the vendors or customer service site.

B. Automatic Diagnosis of Protocol Errors

In accordance with the present invention, a trace file is generated and then fed through an automatic trace analysis (ATA) and diagnosis/resolution generation module (DR) to identify a protocol error and suggest a potential solution. The procedures performed in performing this analysis vary depending upon the ATA/DR environment utilize.

Figure 5:
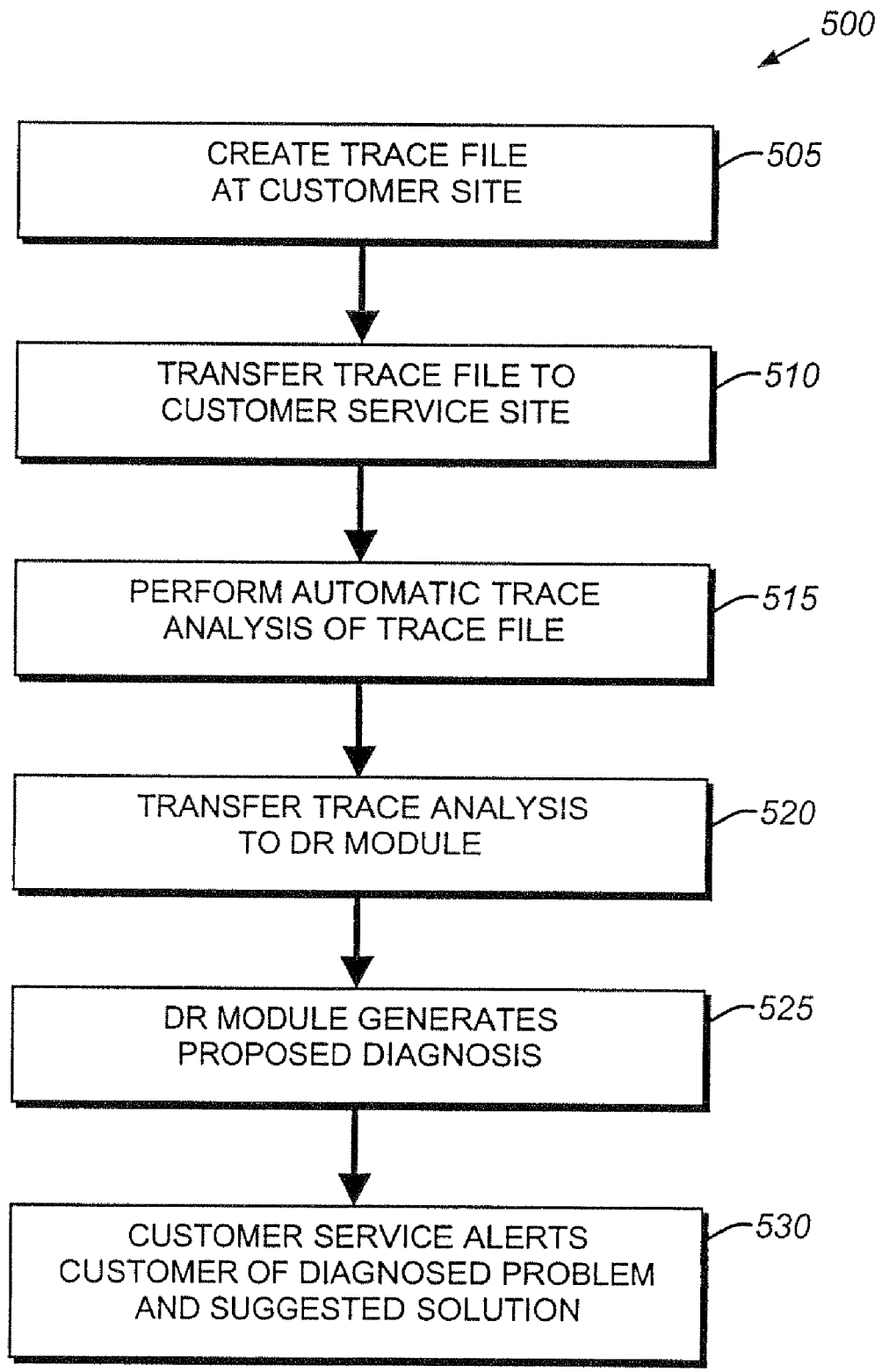
FIG. 5 is a flowchart detailing the steps of a procedure for automatically diagnosing protocol errors from packet traces in accordance with an embodiment of the present invention.

For example, FIG. 5 is a flowchart detailing the steps of a procedure 500 for diagnosing protocol errors from packet traces in accordance with an embodiment of the invention utilizing an environment such as that shown in FIG. 3. Initially, in step 505, a trace file is created at the customer site. This trace file may be generated using any conventional packet trace capture utility described above. The trace capture utility may be executing on any of the servers or other computers connected to the customer's local area network. The trace file is then, in step 510, transferred to the customer service site. This transfer may be accomplished by, for example, utilizing the well-known file transfer protocol (FTP) or via any other transport protocol. Once the customer service site has received the trace file, an automatic trace analysis is performed on the trace file in step 515. This automatic trace analysis process is, in the exemplary embodiment performed by the automatic trace analysis module (315 from FIG. 3). This automatic trace analysis module thereby generates a trace analysis file which is then transferred, in step 520, to the diagnosis/resolution generation module. The automatic trace analysis is described in further detail below.

The DR module then, in step 525, generates a proposed diagnosis. This proposed diagnosis is generated by comparing the trace analysis file with a signature database (320 of FIG. 3) which contains known trace signatures and errors. The signature database 320 contains trace signatures and correlations with diagnosis and one or more specific actions or resolutions be performed. The suggested solution contained within the database may is be of a specific or generic kind including, for example: (1) providing an existing software upgrade; (2) waiting for a next upgrade to become available; (3) identifying that the problem is associated with another computer connected to the network; (4) identifying a specific patch that is required for an operating system or protocol layer of a computer connected to the network; and (5) that no problem has been found. In the example of "finding no problem," the DR module may alert the customer service or engineering staff of the vendor so that the particular problem may be studied in further detail and a new proposed solution be found. The suggested solutions will be generated from the engineering or customer service staff of the vendor and included in the signature database 320. As better solutions are developed for a particular known problem, the signature database may be updated via the update mechanisms, described further below. Once the DR module generates a proposed diagnosis and potential solution, the customer service engineer will then, in step 530, alert the customer of a the diagnosed problem and the suggested solution. The customer may then implement the suggested solution to correct the protocol error. In this embodiment, the ATA and DR modules are used to generate a proposed solution; however, the customer service staff still makes the final determination as to alerting the customer of the diagnosis and proposed and suggested solution.

Figure 6:
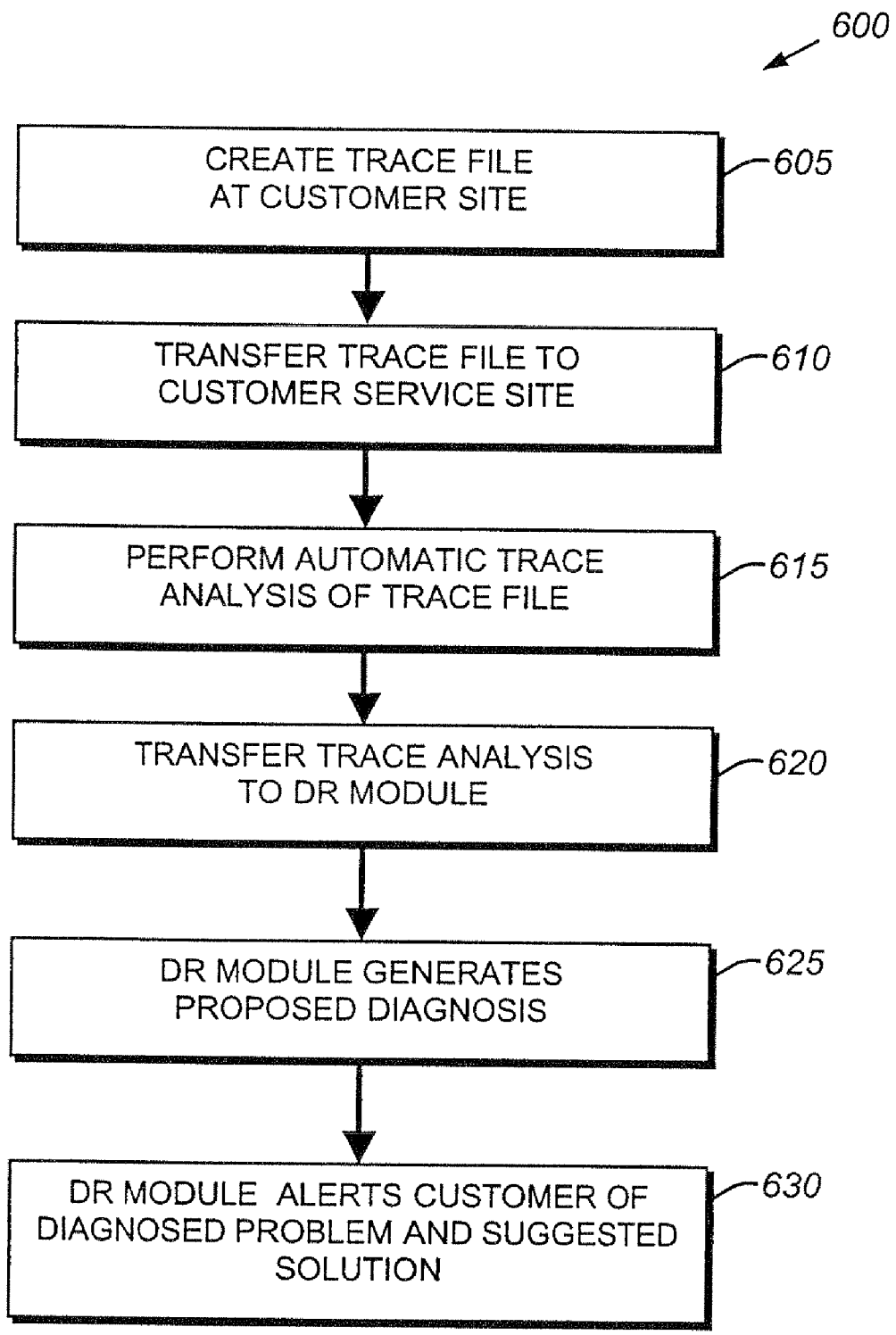
FIG. 6 is a flowchart detailing the steps of a procedure for automatically diagnosing protocol errors from packet traces in accordance with an embodiment of the present invention.

FIG. 6 is a flowchart detailing the steps of a procedure 600 for the automatic diagnosis of protocol errors from packet traces. The procedure 600 differs from that procedure 500 in that the DR module alerts the customer of the diagnosed problem and suggested solution without customer service intervention. Initially, in step 605, the trace file is created at the customer site. The trace file is then transferred, via conventional file transfer protocols, to the customer service site in step 610 over the network. Once the customer service site has received the trace file, then the automatic trace analysis on the trace file (step 615). The trace analysis is then transferred to the DR module in step 620. The DR module then generates a proposed diagnosis in step 625. The DR module utilizes a signature database to identify a probable error and suggested solution. Finally, in step 630, the DR module alerts the customer of the diagnosed problem and suggested solution. This alert may be accomplished via an electronic message sent to the customer is or by a posting of information on, for example, a world wide web page that is accessible by the customer. In this embodiment, as described in procedure 600, the customer service staff of the vendor is not required to examine the suggested solution and the proposed diagnosis generated by the DR. By automating the alert to customers, the customer service department may now operate more efficiently and with a lower manpower requirement.

Figure 7:
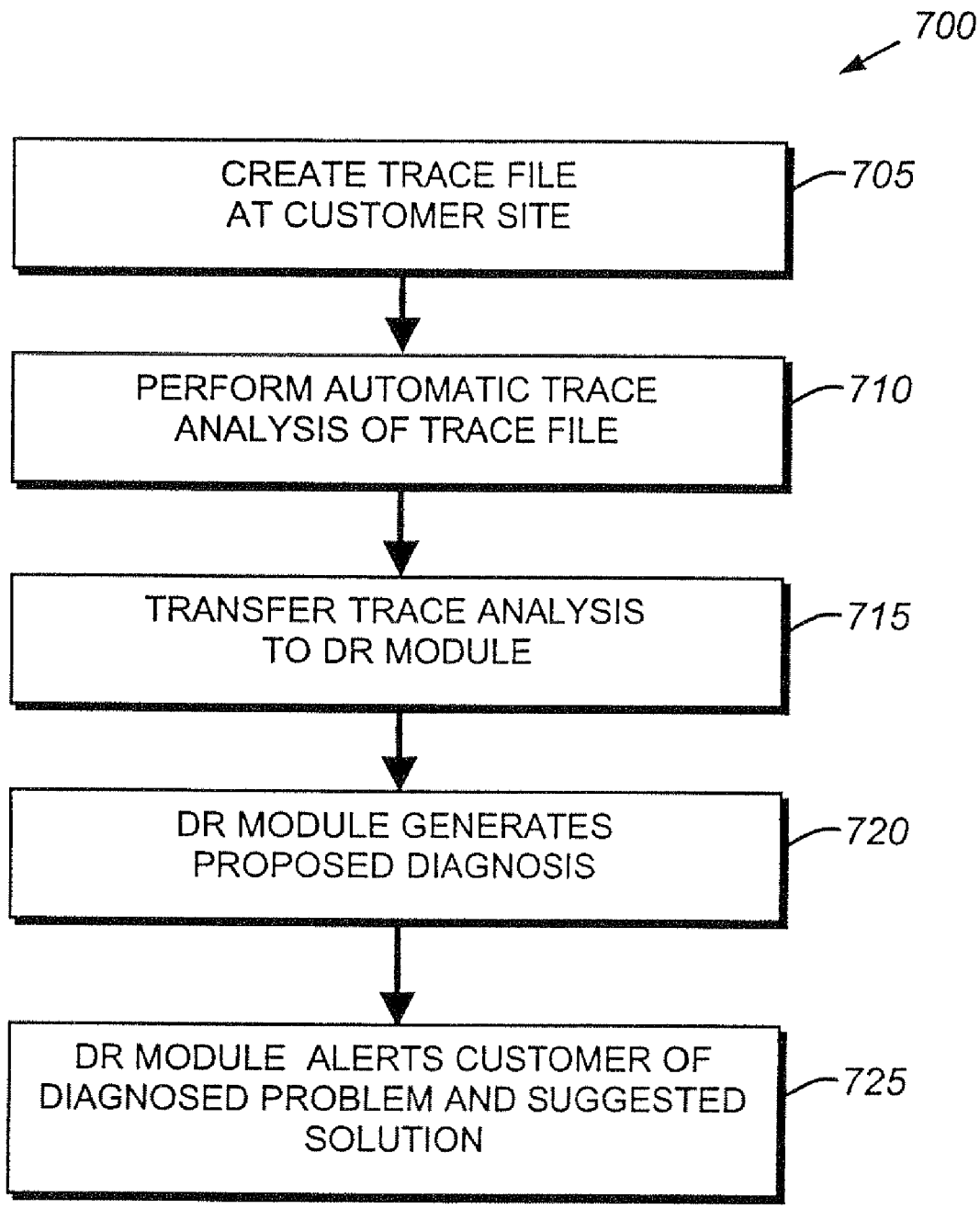
FIG. 7 is a flowchart detailing the steps of a procedure for automatically diagnosing protocol errors from packet traces in accordance with an embodiment of the present invention.

In an alternate embodiment, the ATA and DR module are located at the customer's site. Such an exemplary configuration is shown in the environment 400 of FIG. 4. An illustrative procedure 700 for the automatic diagnosis of a protocol error from a trace analysis is shown in FIG. 7. Initially, in step 705, a trace file is generated at the customer site. This trace file may be generated using well-known and conventional trace capture utilities executing on a computer or server connected to the customer's local area networking. Further, in step 710, an automatic trace analysis is performed on the trace file to generate at race analysis of the trace file. The automatic trace analysis is performed by the ATA module resident on a client connected to the customer's network. The trace analysis generated in step 710 is then transferred to the DR module in step 715. The DR module generates a proposed diagnosis in step 720. The proposed diagnosis is generated by comparing the results of the trace analysis with a signature database that correlates known trace file signatures and errors along with suggested solutions. Once the DR module has generated a proposed diagnosis and located a suggested solution from the signature database, the DR module alerts the customer of the diagnosed problem and the suggested solution (step 725). The alert mechanism may operate by sending an electronic message to the customer's administrator (such as conventional "email"). In alternate embodiments, as the DR module is executing locally on the customer's computer, the alert mechanism may be via a dialogue box or other display option on a graphical user interface (GUI) executing on the client. This dialogue box may be implemented using conventional application program interface (API) calls to the operating system. Alternately, the alert may be displayed on a web page accessible to an administrator. In this embodiment, the web page may be dynamically created using conventional tools and procedures, such as perl scripts, common gateway interface (CGI) scripts, and the like.

Figure 8:
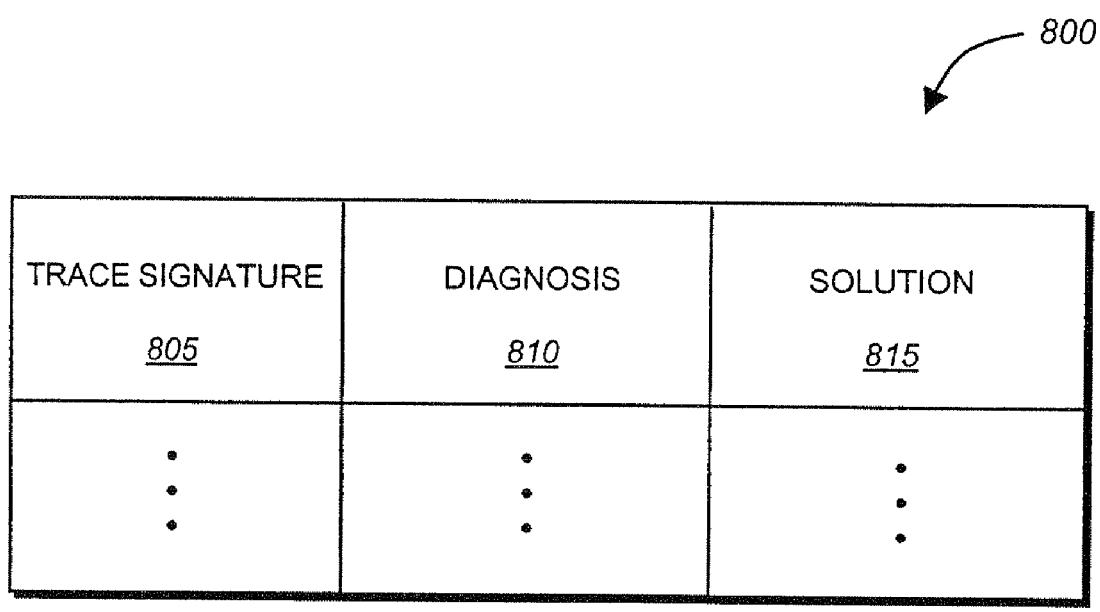
FIG. 8 is a schematic block diagram of an exemplary signature database in accordance with an embodiment of the present invention.

An exemplary signature database 800 is shown in FIG. 8. The database 800 includes a plurality of entries including, for example a trace signature entry 805, a diagnosis entry 810 and a solution entry 815. In the illustrative embodiment, the trace signature entry 805 identifies and includes trace information that acts as a signature or identification of a known error condition. Similarly, the diagnosis field 810 includes an identification of the error generated by the trace signature 805. This diagnosis may be either a numerical value representing a known bug or error in protocol implementation or, in an illustrative embodiment the alpha numeric string that identifies the known problem. Finally, the solution field 815 identifies a known solution to the error. As noted above, the solution may be of a general or a specific kind. For example, the solution may identify an existing software upgrade that should be installed to correct the noted error.

C. Automatic Trace Analysis

The ATA module accepts, as input, a trace file that contains raw data packets that have been captured by a trace capture utility. The ATA module examines each of the data packets in the trace file and examines the TCP headers from each packet in an endpoint pair. Several types of attributes and statistics may be collected from examining these headers, including, for example, dynamics of the connection and various attributes of the connections. This collection of data may be stored in a chain of TCP control blocks (TCBs) for later analysis. The operation of an exemplary ATA module, e.g., tcpanaly, is described in the above-incorporated papers entitled Automatic Packet Trace Analysis of TCP Implementations and SSFNET TCP Simulation Analysis by Tcpanaly.

The routing decisions that are made with each endpoint may be derived by examining the MAC headers from the packets from each endpoint and building the history of routing table changes. These routing decisions may be utilized by the ATA and DR modules for identifying specific known protocol implementation errors. Additionally the ATA module saves any protocol information from higher level protocols operating within (or in cooperation with) TCP including, for example, the Common Internet File System (CIFS), Net-BIOS or the Network File System (NFS).

In the illustrative embodiment, the automatic trace analysis module comprises two sections, a protocol dissection module and a protocol analysis module. The protocol dissection module of the ATA module reads each frame from the packet trace and disassembles the protocol header associated with the packet. This disassembly will identify the type of protocol associated with the packet that will allow the protocol dissection module to register the protocol with the central protocol management function within the ATA module. In one embodiment, the protocol dissectors may be loadable modules or may be plugins that are invoked dynamically at one time. As each protocol header is disassembled to identify the type and nature of the protocol, the resulting payload portion of the protocol packet and/or the portion that performs the next layer of the protocol packet is then passed to a sub-disassembly routine. Thus, the protocol dissection module recursively disassembles each of the nested protocol packets associated with a given packet.

The protocol analysis module may be implemented, in an illustrative embodiment, as an expert system that utilizes data and statistics generated from the trace file. In the illustrative embodiment, the protocol analysis module includes a variety of programming interfaces that may dynamically invoke additional mechanisms, such as plug-ins, callbacks or other conversions. These programming interfaces may be implemented as, for example, application program interfaces (APIs) that enable other software and/or hardware modules executing with ATA module to utilize the data and trace statistics generated from the trace file. Examples of such additional plug-ins may include, for example a performance analysis module, a protocol testing module or a protocol module.

These various modules enable alternate embodiments of the invention to be practiced. Specifically, by changing the embedded intelligence and routines in the DR module with a differing expert system, the DR module may be adapted to perform various differing and specific functionalities. Specifically, one example would be the use of the ATA module and a modified DR module in performing an analysis of a computer system performance. The statistics gathered from each data connection and also the aggregated numbers of all of the network connections to the system being analyzed may is be used for generating a baseline system level for further tests. Additionally, the number of connections taken at later times may be utilized in such a performance analysis system. In such a system, the DR module may include an expert system that utilizes the generated statistics by comparing current values of performance metrics with previously generated baseline values.

In a further alternate embodiment, the ATA and DR systems may be utilized to test a protocol's robustness and implementation. In such an alternate embodiment, the network stack and/or the upper layer protocol layers of the system being tested may be fine tuned by utilizing the behavior and/or analysis of the endpoint data connections identified from the trace file.

In a third alternate embodiment, the ATA and DR systems may be utilized generate a signature analysis of an operating system or other protocol implementation. By including intelligence within the ATA and DR modules, a local system executing the ATA/DR modules may determine the type of operating system and/or protocol implementation executing on a given machine connected to the network by analyzing data stored in a trace file.

Table 1, shown below, is an exemplary sample ATA report generated by an ATA module after examining a trace file. As can be seen from the sample ATA report in Table 1, the number of packets seen in the trace file the number of TCP packets traced by the ATA module is displayed. In a total elapsed time, of the examination is also given. The sample ATA report shows that TCP connection was traced and that it was between a computer having a network address of 10.202.14.25 and 144.201.163.91. The first computer sent 17 packets while the second computer sent 12.

TABLE 1

Sample ATA Report

ATA report 30 packets seen, 29 TCP packets traced
Trace file elapsed time: 0:03:08.539999
TCP connection info:
1 TCP connection traced
**************** Brief report ****************
1: 10.202.14.25:542 - 144.201.163.91:nfsd (a2b) 17>12<

Figure 9:
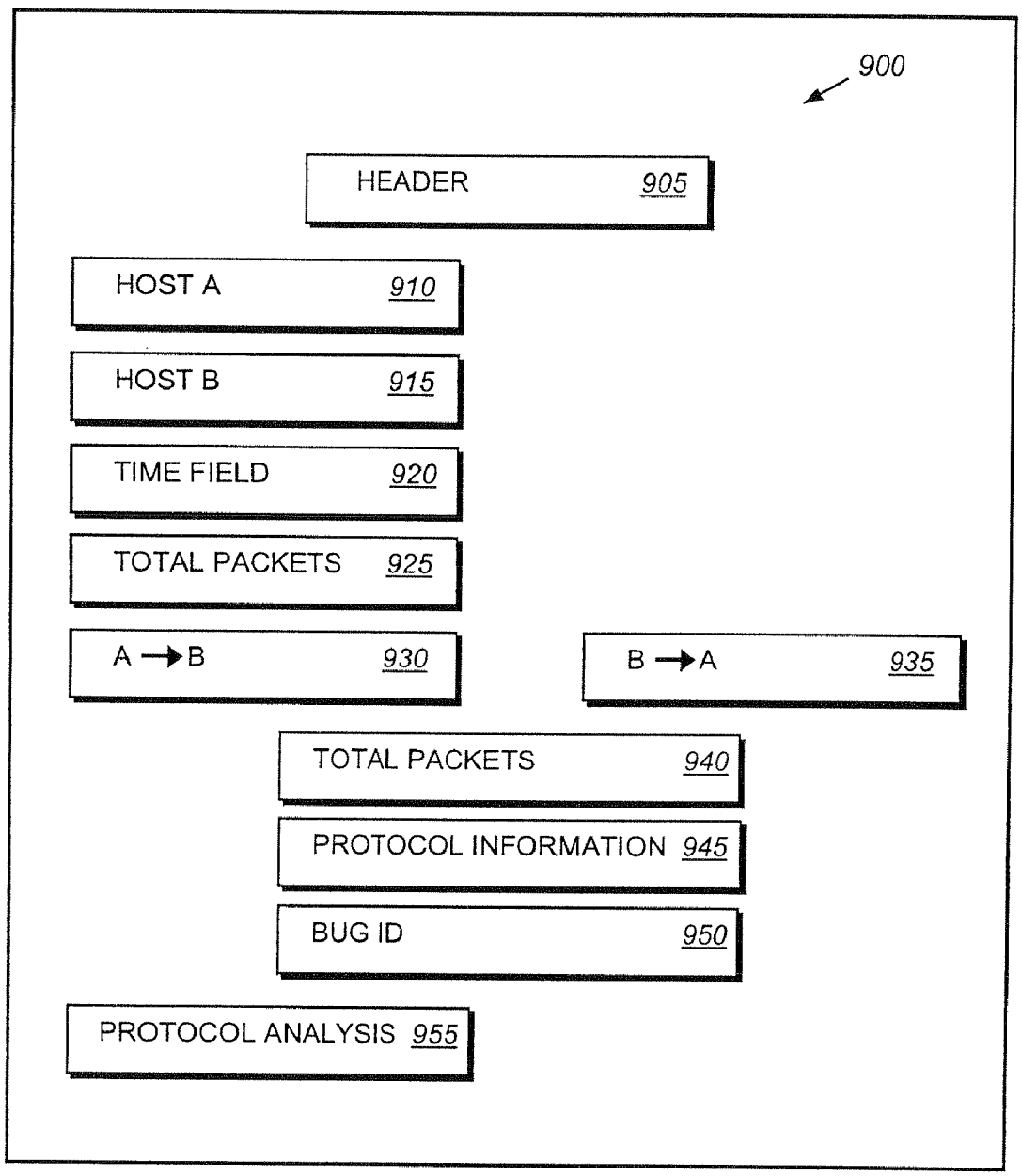
FIG. 9 is a schematic block diagram of an exemplary automatic trace analysis report generated in accordance with an embodiment of the present invention.

An exemplary detailed report 900 from the ATA and DR module is shown in FIG. 9. The report 900 includes a header 905 that identifies the type of number of connections analyzed. For example, the report may identify that it was a TCP or CIFS connection. The report 900 then includes identification of host A 910 and host B 915. These two hosts may be identified by, for example a TCP/IP address, a MAC address or by another networking protocol address depending upon the nature of the network being monitored. There is additionally, a time field 920 that identifies the lapsed time of the trace and, may, in alternate embodiments, identify a first and/or last time stamp of packets within a trace file. This time stamp may be parsed and used by the DR module for analysis of specific forms of error conditions. A total packets field 925 also identifies the total number of packets observed in the trace file. Next, in the illustrative embodiment of the report 900 comes two fields identifying information and packet analysis that flows from host A to host B 930 and from host B to host A 935. These fields may include, for example total packets 940, protocol information 945 and bug IDs 950. The total packets field 940 identifies the number of packets sent from host A to host B and vice versa. The protocol information 945 includes more detailed information concerning various protocol implementations that are dependent upon a given protocol being examined. For example, if the TTP protocol is being analyzed, exemplary protocol information 945 would include the number of zero windows, the number of duplicate acknowledgements and information regarding TCP window shrinking. Additional information may include TCP checksum errors or checksum dropping. In the example of the CIFS protocol, the protocol information 945 may include such information as the number of peer TCP acknowledgments, the number of CIFS connections and the number of packets transmitted to various ports.

The report 900 may also include a bug ID 950 field that identifies known bugs. This bug ID field may be completed by the ATA module or, in the illustrative is embodiment by the DR module utilizing the signature database. The bug ID may either report a numerical value that is associated with an ordered sequence of bugs or errors or, may report a text string identifying the bug or error. Finally, a protocol analysis field 955 includes detailed analysis of the protocol trace file. This analysis may include, for example noted errors, missed packets, non-acknowledgements of packets, or any other irregular or abnormal packet trace information.

It should be noted that the exemplary report 900 may be in a different format or, in alternate embodiments, may be implemented as a graphical display in, for example, a graphical user interface (GUI). The report is, in the illustrative embodiment, generated by the ATA module. However, in alternate embodiments, the DR module may generate all or part of the report including, for example the bug ID 950 field.

To again summarize, a system and method for automatically diagnosing protocol errors is provided. The system and method comprises an automatic trace analysis module and diagnosis/resolution generation module (DR). A trace file is created of packet data traces on a customer's local area network. The trace file is then fed into the ATA module which generates an analysis of the packet data traces. This analysis is then fed to the DR module, which compares the trace analysis with a signature database to then identify a known error. If the DR module locates a signature matching the trace signature in the database, then the DR module utilizes the database to suggest a solution to the error. In an illustrative embodiment, the DR module will suggest the solution to a member of the customer service staff, which will then alert the customer of the suggested solution. In an alternate embodiment, the DR module will directly alert the customer of the suggested solution, without customer service staff intervention. In such an embodiment, the DR module may email the customer to alert him of the error condition.

The locations of the DR and ATA modules may be varied according to embodiments of the present invention. In one illustrative embodiment, the ATA and DR modules are located on the customer service site. In such an embodiment, the trace file, which is generated locally at the customer site, is then transferred to the customer service site for processing with by the ATA and DR modules. In another embodiment, the ATA and DR modules are located locally on the customer site. In such embodiments, the trace file is generated at the customer site and then fed directly into the ATA and DR modules. In such an embodiment, the trace file does not need to be transmitted from the customer site to the customer service site. This lack of transmission improves diagnosis times as network congestion and transmittal times may be significant.

The foregoing has been a detailed description of an illustrative embodiment of the invention. Various modifications and additions can be made without departing from the spirit and scope of the invention. For example, the ATA and DR modules may be located at either the customer's or customer service site. In alternate embodiments, the DR and ATA modules may be located on differing sites or may be combined into a single module that performs a functionality of both the ATA and DR modules. Accordingly, this description is meant to be taken only by way of example and not to otherwise limit the scope of the invention.

What is claimed is:

1. A method for automatically diagnosing a protocol error from a packet trace, comprising:
   maintaining, on a computer, a signature database having trace signature entries, each of the trace signature entries identifying a protocol error;
   generating, by a first processor, a trace file;
   performing, by a second processor, an automatic trace analysis of the trace file to generate a trace signature associated with an error in protocol;
   comparing, by the second processor, the trace signature with entries in the signature database to identify a known protocol error and a solution associated with said protocol error by automatically matching the trace signature with one of the trace signature entries in the signature database, wherein comparing the is trace signature with entries in the signature database provides a diagnosis for the protocol error associated with the trace signature; and
   generating a proposed solution to the protocol error based on the diagnosis.

2. The method of claim 1 further comprising:
   alerting, by a second computer, a customer of the diagnosis and solution.

3. The method of claim 2 wherein alerting further comprises:
   displaying a dialog box to a user.

4. The method of claim 1 further comprising:
   alerting, by a diagnosis module, a customer of the diagnosis and the solution.

5. The method of claim 4 wherein alerting further comprises:
   sending an email to the customer.

6. The method of claim 1 wherein generating the trace file further comprises:
   storing copies of detected packets in the trace file.

7. A system for diagnosing protocol errors from a packet trace, the system comprising:
   a signature database having trace signature entries, each of the trace signature entries identifying a known protocol error, a trace signature and a solution;
   an automatic trace analysis module configured to analyze a trace file to generate a trace signature associated with an error in protocol; and
   a diagnosis/resolution module configured to accept, as an input, a trace analysis file and identify one or more protocol errors from the associated trace signature by comparing the trace signature with entries in the signature database to identify a known protocol error and a solution associated with said protocol error by automatically matching the trace signature with one of the trace signature entries in the signature database, wherein comparing the trace signature with entries in the signature database provides a diagnosis for the protocol error associated with the trace signature.

8. The system of claim 7 further comprising a trace capture utility, the trace capture utility configured to generate the trace file for input to the automatic trace analysis module.

9. The system of claim 7 wherein the automatic trace analysis module and the diagnosis/resolution module are located at customer service site.

10. The system of claim 7 wherein the automatic trace analysis module and the diagnosis/resolution generation module are located on a customer site.

11. A method for automatically diagnosing a protocol error, comprising:
    maintaining, on a computer, a signature database having trace signature entries, each of the trace signature entries identifying a protocol error;
    analyzing, by a processor, a packet trace to generate a trace signature associated with an error in protocol; and
    comparing, by the processor, the generated trace signature with entries in the signature database to identify a known protocol error and a solution associated with said protocol error by automatically matching the trace signature with one of the trace signature entries in the signature database, wherein comparing the trace signature with entries in the signature database provides a diagnosis for the protocol error associated with the trace signature.

12. The method of claim 11 wherein the packet traces are generated by a packet trace capture utility.

13. The method of claim 11 further comprising:
    utilizing the diagnosis to generate a proposed solution to the protocol error.

14. The method of claim 13 further comprising:
    alerting customer service of the proposed solution.

15. The method of claim 13 further comprising:
    alerting a user of the proposed solution.

16. The method of claim 13 further comprising:
    performing the proposed solution to correct the protocol error.

17. A computer readable medium containing executable program instructions executed by a processor, comprising:
    program instructions that maintain a signature database on a computer, the signature database having trace signature entries, each of the trace signature entries identifying a protocol error;
    program instructions that analyze, by the processor, a packet trace to generate a trace signature associated with an error in protocol; and
    program instructions that compare, by the processor, the generated trace signature with entries in the signature database to identify a known protocol error and a solution associated with said protocol error by automatically matching the trace signature with one of the trace signature entries in the signature database, wherein comparing the trace signature with entries in the signature database provides a diagnosis for the protocol error associated with the trace signature.

18. A diagnosis and resolution module for automatically diagnosing a protocol error from a packet trace, the diagnosis and resolution module comprising:

means for maintaining a signature database on a computer, the signature database having trace signature entries, each of the trace signature entries identifying a protocol error;

means for accepting a trace signature associated with an error in protocol from an automatic trace analysis module; and means for comparing the trace signature generated by the automatic trace analysis with entries in the signature database to identify a known protocol error and a solution associated with said protocol error by automatically matching the trace signature with one of the trace signature entries in the signature database, wherein comparing the trace signature with entries in the signature database provides a diagnosis for the protocol error associated with the trace signature.

* * * * *